(12) United States Patent
Park

(10) Patent No.: US 9,549,088 B2
(45) Date of Patent: *Jan. 17, 2017

(54) METHOD OF ATTACHING AND SENDING FILE THROUGH WEBMAIL FROM IMAGE FORMING APPARATUS, AND IMAGE FORMING APPARATUS TO PERFORM THE METHOD

(71) Applicant: SAMSUNG ELECTRONICS CO., LTD., Suwon-si, Gyeonggi-do (KR)

(72) Inventor: Hyun-wook Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,409

(22) Filed: Feb. 10, 2015

(65) Prior Publication Data

US 2015/0156346 A1    Jun. 4, 2015

Related U.S. Application Data

(63) Continuation of application No. 12/473,585, filed on May 28, 2009, now Pat. No. 8,970,869.

(30) Foreign Application Priority Data

Oct. 6, 2008  (KR) .................. 10-2008-0097787

(51) Int. Cl.
*H04N 1/00* (2006.01)
*G06Q 10/10* (2012.01)

(52) U.S. Cl.
CPC ........ *H04N 1/00212* (2013.01); *G06Q 10/107* (2013.01); *H04N 1/00214* (2013.01); *H04N 1/00217* (2013.01); *H04N 1/00225* (2013.01); *H04N 1/00244* (2013.01); *H04N 1/00464* (2013.01); *H04N 2201/0094* (2013.01)

(58) Field of Classification Search
CPC ............ H04N 1/00212; H04N 1/00217; H04N 1/00225; H04N 2201/0094
USPC ............ 358/1.13, 1.14, 1.15, 1.18, 402, 474
See application file for complete search history.

(56) References Cited

U.S. PATENT DOCUMENTS

| 7,289,995 B2 | 10/2007 | Motoyama et al. |
| 7,419,100 B2 * | 9/2008 | Groeneboer ....... H04N 1/00204 235/472.01 |
| RE40,892 E | 9/2009 | Iida |
| 8,022,821 B2 | 9/2011 | Joseph et al. |

(Continued)

FOREIGN PATENT DOCUMENTS

| JP | 2003-114855 | 4/2003 |
| JP | 2008-217750 | 9/2008 |

OTHER PUBLICATIONS

Korean Office Action dated Sep. 24, 2013 issued in KR Application No. 10-2013-0086964.

(Continued)

*Primary Examiner* — Allen H Nguyen
(74) *Attorney, Agent, or Firm* — Staas & Halsey LLP

(57) ABSTRACT

An image forming apparatus which logs into an external webmail server by using a web browser included in the image forming apparatus, the webmail is written on a webpage of the webmail server, a file to be attached to the webmail is selected, and the selected file is attached to the webmail so as to send the webmail to the webmail server.

26 Claims, 5 Drawing Sheets

(56) References Cited

U.S. PATENT DOCUMENTS

| | | |
|---|---|---|
| 8,233,198 B2 | 7/2012 | Todaka |
| 2006/0028675 A1 | 2/2006 | Watanabe et al. |
| 2006/0143684 A1 | 6/2006 | Morris |
| 2006/0265389 A1 | 11/2006 | Yamahata et al. |
| 2007/0061760 A1 | 3/2007 | Ikegami |
| 2007/0168459 A1 | 7/2007 | Fujita et al. |
| 2008/0151301 A1 | 6/2008 | Ito |
| 2008/0151317 A1* | 6/2008 | Imine ................. H04N 1/00458 358/403 |
| 2009/0051952 A1* | 2/2009 | Abe ..................... G06F 9/4443 358/1.13 |
| 2009/0268229 A1 | 10/2009 | Richardson et al. |

OTHER PUBLICATIONS

Korean Office Action dated May 23, 2013 issued in KR Application No. 10-2008-0097787.

U.S. Office Action dated Mar. 21, 2012 from U.S. Appl. No. 12/473,585.

U.S. Office Action dated Sep. 26, 2012 from U.S. Appl. No. 12/473,585.

U.S. Advisory Action dated Jan. 2, 2013 from U.S. Appl. No. 12/473,585.

U.S. Office Action dated Apr. 25, 2014 from U.S. Appl. No. 12/473,585.

U.S. Notice of Allowance dated Oct. 24, 2014 from U.S. Appl. No. 12/473,585.

U.S. Appl. No. 12/473,585, filed May 28, 2009, Hyun-wook Park, Samsung Electronics Co., Ltd.

\* cited by examiner

| Send | Save Draft |

201 — To :
210 — CC :
220 — Subject :
230 — Text: :

Attach :  File Search... — 240

File Search Method
- ○ Scan and Attach — 301
- ○ Search Scan-to-WebMail Type File — 310
- ○ File Search using Box Operation User Interface — 320

Next

FIG. 4

| File Name | User Name | Job Type | Date |
|---|---|---|---|
| WebMail_1.jpg | aa | Scan to WebMail | 06/20/2008 |
| WebMail_2.jpg | aa | Scan to WebMail | 06/21/2008 |
| WebMail_3.jpg | aa | Scan to WebMail | 06/21/2008 |
| | | | |

METHOD OF ATTACHING AND SENDING FILE THROUGH WEBMAIL FROM IMAGE FORMING APPARATUS, AND IMAGE FORMING APPARATUS TO PERFORM THE METHOD

CROSS-REFERENCE TO RELATED APPLICATIONS

This application is a continuation application of U.S. application Ser. No. 12/473,585, filed on May 28, 2009, in the United States Patent and Trademark Office, which claims priority under 35 U.S.C. §119(a) from Korean Patent Application No. 10-2008-0097787, filed on Oct. 6, 2008, in the Korean Intellectual Property Office, the disclosures of each of which are incorporated herein in its entirety by reference.

BACKGROUND

1. Field of the Invention

The present general inventive concept relates to a method of attaching and sending a file through a webmail from an image forming apparatus, and an image forming apparatus to perform the method.

2. Description of the Related Art

In general, an image forming apparatus performs at least one of various functions of a printer, a photocopier, a scanner, a fax machine, etc.

As more functions may be embedded in an image forming apparatus in light of the latest technological developments, a user may separately perform a printing operation, a photocopying operation, a faxing operation, a scanning operation, etc. by using the image forming apparatus. Also, the image forming apparatus may perform various other functions corresponding to users' demands, for example, a function of sending scanned data generated by performing a scanning operation through an email or a fax message.

Currently popular is a network scan function in which a scanned image file obtained by scanning an image or a document by using the image forming apparatus is sent to a destination through a network. The network scan function includes a scan-to-folder function in which a scanned image file of the image forming apparatus is sent to a certain folder of a destination computer by using a file transfer protocol (FTP) or a server message block (SMB) protocol, and a scan-to-email function in which a scanned image file of the image forming apparatus is attached to an email so as to send the email to a simple mail transfer protocol (SMTP) server by using an SMTP. The SMTP server should be previously set in the image forming apparatus in order to perform the scan-to-email function. That is, the SMTP server should be previously set in the image forming apparatus by recognizing an address and a port number of the SMTP server. Also, only one SMTP server can be set in the image forming apparatus and thus, if two or more addresses of different domains are used, the SMTP server should be differently set whenever an email address of a domain is changed.

Meanwhile, when sending emails, current Internet users use webmails provided by portal sites such as Naver or Daum in Korea, or Google or Yahoo in the U.S.A. Here, a webmail is an email that can be sent by logging into a webmail server through a web browser of a certain portal site and using a web user interface provided by the portal site. If the portal site does not allow SMTP accesses, emails can only be sent through the web browser and cannot be sent by using the scan-to-email function of the image forming apparatus, which uses the SMTP. Thus, demands for a method of performing a network scan function through a webmail from a network image forming apparatus have increased.

SUMMARY

The present general inventive concept provides a method of attaching and sending a file through a webmail that is familiar to users, when the file is attached and sent through an email from an image forming apparatus, and an image forming apparatus to perform the method Additional features and utilities of the present general inventive concept will be set forth in part in the description which follows and, in part, will be obvious from the description, or may be learned by practice of the general inventive concept.

Exemplary embodiments of the present general inventive concept provide a method of attaching and sending a file through a webmail from an image forming apparatus, the method including logging into an external webmail server by using a web browser stored in the image forming apparatus, writing the webmail on a webpage of the webmail server, selecting a file to be attached to the webmail, and attaching the selected file to the webmail so as to send the webmail to the webmail server.

Exemplary embodiments of the present general inventive concept also provide a computer readable recording medium having recorded thereon computer-readable medium as a computer program to execute a method, the method includes logging into an external webmail server by using a web browser, writing the webmail on a webpage of the webmail server, selecting a file to be attached to the webmail, and attaching the selected file to the webmail so as to send the webmail to the webmail server.

Exemplary embodiments of the present general inventive concept also provide an image forming apparatus which attaches and sends a file through a webmail, the image forming apparatus including a user interface unit to log into an external webmail server of the image forming apparatus and to display a webpage of the webmail server in order to write the webmail, a file search module to select a file to be attached to the webmail written on the webpage, and an embedded web browser to attach the file selected by the file search module to the webmail so as to send the webmail to the webmail server.

Exemplary embodiments of the present general inventive concept also provide an image forming apparatus which includes a user interface unit configured to display a webpage of a webmail server and a unit configured to attach a file to a webmail through the webpage and to send the webmail and the attached file through the webmail server.

The image forming apparatus may include an image forming unit to form an image on a printing medium according to data corresponding to the file.

The image forming apparatus may include a scan unit to scan a document to generate the file, wherein the webpage includes a scan menu to control the scan unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 2 is a schematic image of a webpage to send a webmail, according to an exemplary embodiment of the present general inventive concept;

FIG. 3 is a schematic image of a user interface to select a file search method in order to search for a file to be attached to a webmail, according to an exemplary embodiment of the present general inventive concept;

FIG. 4 is a table of a list of files of a scan-to-webmail job type, according to an exemplary embodiment of the present general inventive concept.

DETAILED DESCRIPTION OF THE EMBODIMENTS

Figure 1A:
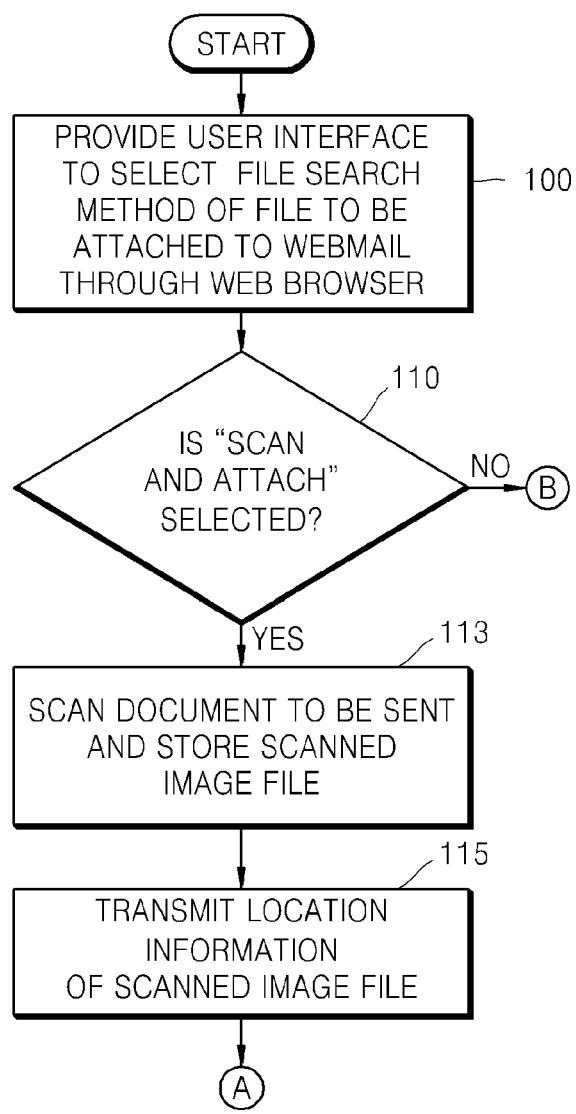
FIGS. 1A and 1B are flowcharts of a method of attaching and sending a file through a webmail from an image forming apparatus, according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1B:
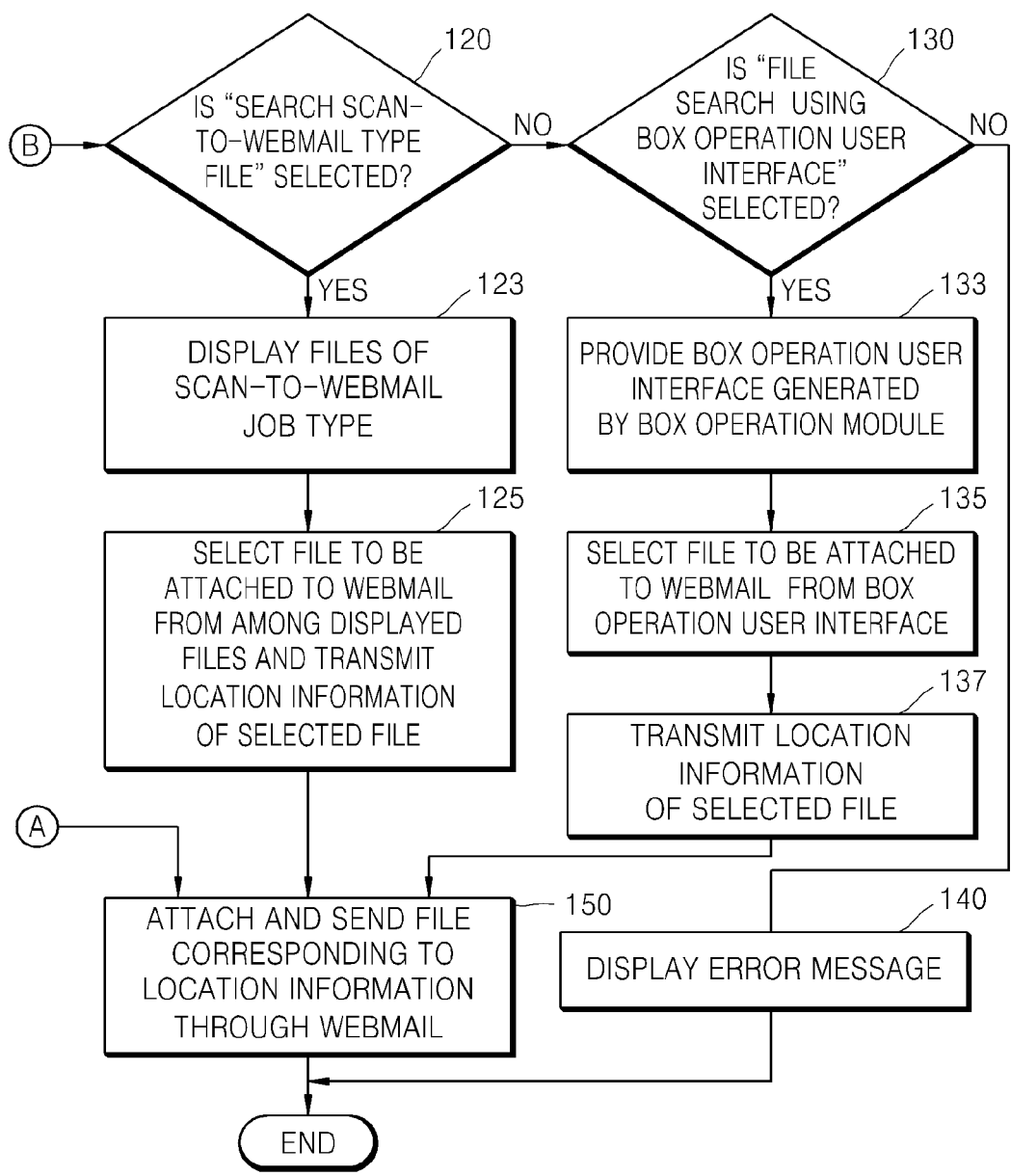

FIGS. 1A and 1B are flowcharts of a method of attaching and sending a file through a webmail from an image forming apparatus, according to an exemplary embodiment of the present general inventive concept.

Referring to FIG. 1A, in operation 100, a user interface to select a file search method is provided through a web browser in order to search for a file to be attached to the webmail. According to the present exemplary embodiment, the image forming apparatus (not illustrated) includes a memory to store the web browser. When the web browser is displayed on a display unit as the user interface of the image forming apparatus, a user using the image forming apparatus may log into a webmail server that provides a webmail service by using the web browser and a webpage to send the webmail is displayed on the user interface. In exemplary embodiments, the image forming apparatus may be connected to the webmail server through a wired or wireless communication line such as Internet.

FIG. 2 is a schematic image of a webpage 200 to send a webmail, according to an exemplary embodiment of the present general inventive concept.

Referring to FIG. 2, the webmail is completed by filling blanks of a recipient field 201, a carbon copy (CC) field 210, a subject field 220, and a text field 230 of the webpage with basic information to send the webmail. In exemplary embodiments, the recipient field 201, the carbon copy (CC) field 210, the subject field 220, and the text field 230 may be filled with a combination of letters, numbers, and/or characters using an input unit. Then, if a file search button 240 is selected in order to search for a file to be attached to the webmail, a user interface to select a file search method is provided.

FIG. 3 is a schematic image of a user interface 300 to select a file search method in order to search for a file to be attached to a webmail, according to an exemplary embodiment of the present general inventive concept.

Referring to FIG. 3, according to the present exemplary embodiment, one of a "Scan and Attach" mode 301 in which a document to be sent is scanned and attached to a webmail, a "Search Scan-to-WebMail Type File" mode 310 in which a file of a certain job type is found and attached to a webmail, and a "File Search using Box Operation User Interface" mode 320 in which a file is found and attached to a webmail by using a desired program may be selected as the file search method.

Referring now back to FIG. 1A, in operation 110, it is determined whether a "Scan and Attach" mode is selected from the user interface 300 illustrated in FIG. 3. If the "Scan and Attach" mode is selected, the method proceeds to operation 113. If the "Scan and Attach" mode is not selected, the method proceeds to operation 120 (see FIG. 1B).

In operation 113, a document to be sent is scanned, and data representing the scanned document is stored as a scanned image file. In this case, the scanned image file may be stored in a hard disk (HDD) or memory of the image forming apparatus, a portable memory device connected to the image forming apparatus, or an external memory device such as a personal computer (PC), a digital camera, a mobile phone, etc., which is connected to the image forming apparatus. However, the present general inventive concept is not limited thereto.

In operation 115, storage location information of the scanned image file is transmitted to a webmail sending module.

Referring now to FIG. 1B, in operation 120, it is determined whether a "Search Scan-to-WebMail Type File" mode is selected from the user interface 300 illustrated in FIG. 3. If the "Search Scan-to-WebMail Type File" mode is selected, the method proceeds to operation 123. If the "Search Scan-to-WebMail Type File" mode is not selected, the method proceeds to operation 130.

In operation 123, files of a scan-to-webmail job type are found and are displayed. According to the present exemplary embodiment, a document may be scanned and stored as a scanned image file by setting a job type of the scanned image file to be the scan-to-webmail type. In this case, the scanned image file may be stored in an HDD or memory of the image forming apparatus, a portable memory device connected to the image forming apparatus, or an external memory device such as a PC, a digital camera, a mobile phone, etc., which is connected to the image forming apparatus. Thus, in operation 123, files of the scan-to-webmail job type are found from among a plurality of stored files and are displayed.

FIG. 4 is a table 400 of a list of files of a scan-to-webmail job type, according to an exemplary embodiment of the present general inventive concept.

Referring to FIG. 4, the files found in operation 123 of FIG. 1B may be displayed together with a file name item 401, a user name item 410, a stored date item 420, etc. Although the files of the scan-to-webmail job type are displayed according to the present exemplary embodiment, the present general inventive concept is not limited thereto. Files of a certain job type 430 may be found and displayed in order to attach and send the files of the certain job type through a webmail.

Referring now back to FIG. 1B, in operation 125, the file to be attached to the webmail may be selected from among the displayed files and storage location information of the selected file may be transmitted to the webmail sending module.

In operation 130, it is determined whether a "File Search using Box Operation User Interface" mode is selected from the user interface 300 illustrated in FIG. 3. If the "File Search using Box Operation User Interface" mode is selected, the method proceeds to operation 133. If the "File Search using Box Operation User Interface" mode is not selected, the method proceeds to operation 140.

In operation 133, a box operation user interface generated by a box operation module is provided. According to the present exemplary embodiment, the box operation module generates folders according to users or groups in a storage device of the image forming apparatus and stores files generated by the image forming apparatus in the folders generated in the storage device, thereby managing the files. Thus, the files stored in the storage device may be selected based on the users or the groups from the box operation user interface generated by the box operation module.

In operation 135, the file to be attached to the webmail may be selected from the box operation user interface from among the files stored by the box operation module in the folders generated in the image forming apparatus according to the users or the groups.

In operation 137, storage location information of the selected file may be transmitted to the webmail sending module.

In operation 140, an error message may be displayed. That is, if the file to be attached to the webmail cannot be found by using the user interface 202 to select the file search method, the error message may be displayed so as to inform a user of failure to find the file.

In operation 150, a file corresponding to the transmitted storage location information may be attached to the webmail so as to send the webmail to the webmail server.

Although the file search method is selected from the user interface 300 illustrated in FIG. 3 according to the present exemplary embodiment, the present general inventive concept is not limited thereto. One of the described file search methods may be set by default, a file may be found by using a file search method set by default, and the found file may be attached to the webmail so as to send the webmail to the webmail server. However, the present general inventive concept is not limited thereto.

Figure 5:
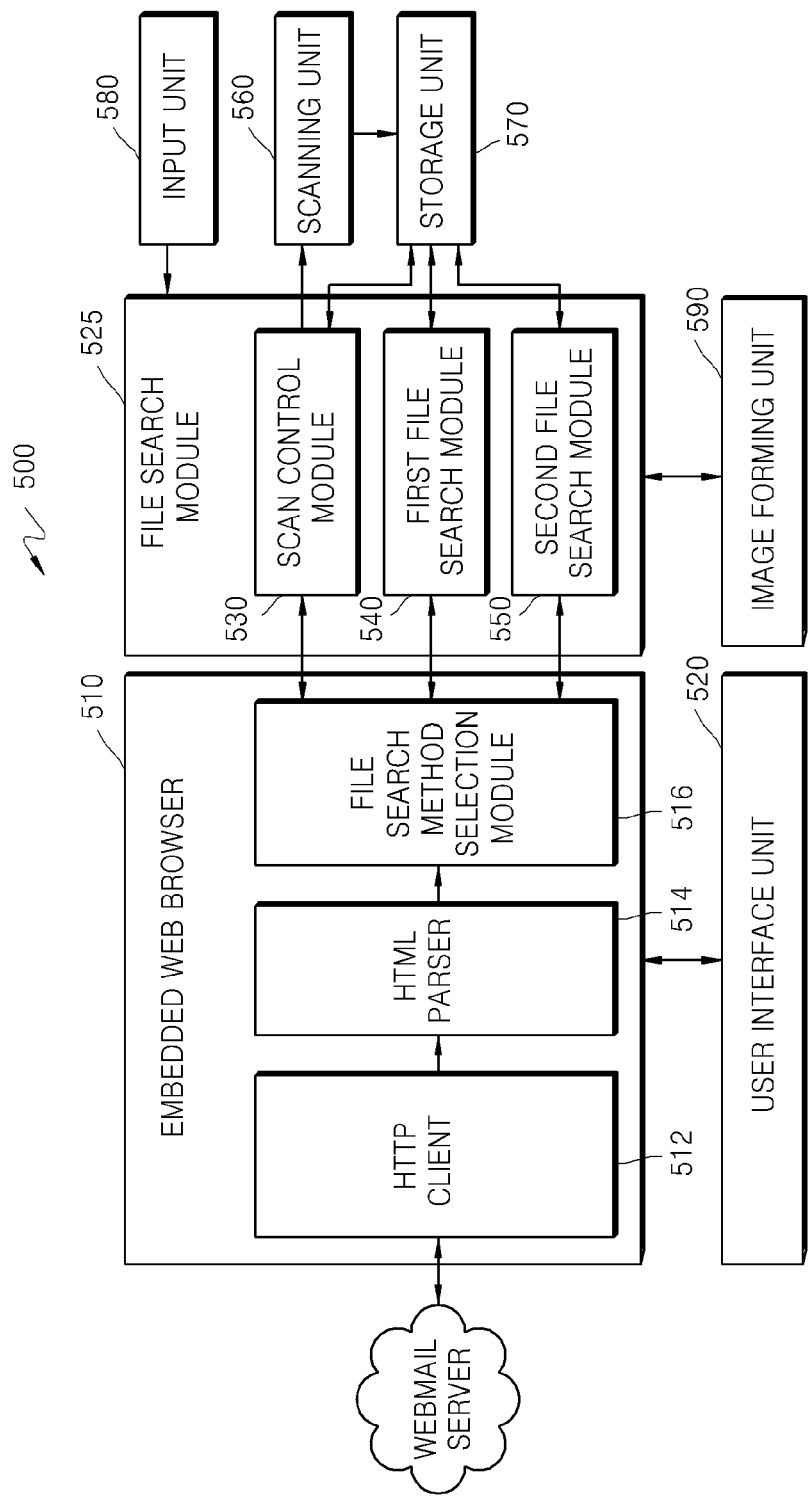
FIG. 5 is a block diagram of an image forming apparatus to attach and send a file through a webmail, according to an exemplary embodiment of the present general inventive concept.

FIG. 5 is a block diagram of an image forming apparatus 500 to attach and send a file through a webmail, according to an exemplary embodiment of the present general inventive concept.

Referring to FIG. 5, the image forming apparatus 500 includes an embedded web browser 510, a user interface unit 520, a file search module 525, a scanning unit 560, and a storage unit 570. However, the present general inventive concept is not limited thereto. That is, in exemplary embodiments, the image forming apparatus 500 may include an input unit 580 and an image forming unit 590.

The embedded web browser 510 searches files stored in the image forming apparatus 500 by using a scan control module 530, a first file search module 540, and a second file search module 550 and attaches a file selected from among the found files to the webmail so as to send the webmail to the webmail server.

In more detail, the embedded web browser 510 includes a hypertext transfer protocol (HTTP) client 512, a hypertext markup language (HTML) parser 514, and a file search method selection module 516.

The HTTP client 512 may be connected to a webmail server and transmits/receives data to/from the webmail server. Thus, a webmail to which a file is attached may be sent to the webmail server through the HTTP client 512.

The HTML parser 514 receives an HTML document from the webmail server and parses the HTML document.

The file search method selection module 516 generates a user interface to select a file search method and, if a user selects a file search method, executes a module corresponding to the selected file search method. Also, the file search method selection module 516 attaches a file selected by the executed module to the webmail.

The user interface unit 520 provides various user interfaces according to the present exemplary embodiment. Initially, when the image forming apparatus 500 accesses the webmail server through the embedded web browser 510, the user interface unit 520 provides a webpage for sending the webmail. In more detail, the user interface unit 520 may provide the webpage 200 illustrated in FIG. 2. The webmail is completed by filling blanks of the recipient field 201, the CC field 210, the subject field 220, and the text field 230 of the webpage illustrated in FIG. 2 with basic information for sending the webmail. Then, if the file search button 240 illustrated in FIG. 2 is selected in order to search for a file to be attached to the webmail, the user interface unit 520 provides the user interface 300 to select the file search method, which is illustrated in FIG. 3. Also, the user interface unit 520 provides a user interface generated by the scan control module 530, the first file search module 540, or the second file search module 550. However, the present general inventive concept is not limited thereto. That is, in exemplary embodiments, the user interface unit 520 may further include a display unit (not illustrated) which may be mounted to a housing of the image forming apparatus 500. In alternative exemplary embodiments, the display unit may be integrally formed with the user interface unit 520.

If the "Scan and Attach" mode 301 is selected from the user interface illustrated in FIG. 3, the file search method selection module 516 executes the scan control module 530. If the "Search Scan-to-WebMail Type File" mode 310 is selected from the user interface illustrated in FIG. 3, the file search method selection module 516 executes the first file search module 540. If the "File Search using Box Operation User Interface" mode 320 is selected from the user interface illustrated in FIG. 3, the file search method selection module 516 executes the second file search module 550.

The file search module 525 selects a file to be attached to the webmail written on the webpage. In more detail, the file search module 525 includes the scan control module 530, the first file search module 540, and the second file search module 550.

The scan control module 530 drives the scanning unit 560 so as to generate a scanned image file to be attached to the webmail and stores the scanned image file in the storage unit 570. Although the scanned image file is stored in the storage unit 570 according to the present exemplary embodiment, the present general inventive concept is not limited thereto. The scanned image file may be stored in a portable memory device connected to the image forming apparatus 500, or an external memory device such as a PC, a digital camera, a mobile phone, etc., which is connected to the image forming apparatus 500. However, the present general inventive concept is not limited thereto. That is, in exemplary embodiments, the scanning unit 560 may emit a laser beam to scan a document, receive the laser beam reflected from the document, and generate a signal representing the scanned document.

Also, the scan control module 530 transmits storage location information of the scanned image file in the storage unit 570, to the file search method selection module 516.

The first file search module 540 searches for files of a scan-to-webmail job type from among a plurality of files stored in the storage unit 570, and provides a list of the found files to the user through the user interface unit 520 so as to select a file to be attached to the webmail. Also, the first file search module 540 transmits storage location information of the file selected by using the user interface unit 520, in the storage unit 570, to the file search method selection module 516. Although the files of the scan-to-webmail job type are found according to the present exemplary embodiment, the present general inventive concept is not limited thereto. Files of a certain job type may be found and provided so as to select a file to be attached to the webmail.

The second file search module 550 generates a user interface for searching for files stored in folders generated for users or groups in the storage unit 570, by using a box operation module, and provides the user interface to the user through the user interface unit 520 so that the user may select a file to be attached to the webmail. Also, the second file search module 550 transmits storage location information of the file selected by using the user interface unit 520, in the storage unit 570, to the file search method selection module 516. Although the second file search module 550 searches for the files by using the user interface generated by the box operation module according to the present exemplary embodiment, the present general inventive concept is not limited thereto. The files may be found by using a user interface generated by another desired program.

As such, the user interface unit 520 may provide the user interface generated by the first file search module 540 or the second file search module 550 and the file to be attached to the webmail may be selected by using the user interface. The selected file may be extracted from a storage location by the search method selection module 516 and the extracted file may be attached to the webmail so as to be sent to the webmail server through the HTTP client 512.

In alternative exemplary embodiments, the input unit 580 may be used to input commands or data including letters, numbers, and/or characters to a webpage accessed by the web browser 510 to attach a file to a webmail through the webpage and also to send the webmail and the attached file through a webmail server.

In further exemplary embodiments, the image forming unit 590 may include a medium feeding unit (not illustrated) to feed a printing medium, a printing unit (not illustrated) to print (form) an image on the printing medium according to data stored in a storage unit and a discharge unit to discharge the printing medium.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents

What is claimed is:

1. A method of uploading a file to a web server from an image forming apparatus, the method comprising:
   scanning a document using a scanner to generate a scanned document file;
   storing the scanned document file in a file system of the image forming apparatus;
   receiving a web page from the web server using a web browser included in the image forming apparatus, wherein the received web page has a script object to search for a file to be uploaded;
   displaying the received web page using the web browser; and
   displaying, in response to a user input of selecting the script object to search for the file to be uploaded, a list of one or more files including the scanned document file stored in the file system; and
   receiving a user input selecting the file to be uploaded from among the list of one or more files.

2. The method of claim 1, wherein
   the storing the scanned document file comprises storing the scanned document file in a predetermined location of the file system,
   the list of one or more files includes the scanned document file stored in the predetermined location, and
   the predetermined location includes a predetermined directory of the file system.

3. The method of claim 2, wherein the file is to be uploaded is selected from within the predetermined location based on the user input selecting the file.

4. The method of claim 1, further comprising:
   receiving, by the web browser, information regarding a specific location of the selected file in the file system.

5. The method of claim 4, further comprising:
   transmitting, by the web browser, the selected file to the predetermined destination using the information regarding the specific location of the selected file.

6. The method of claim 2, wherein the displaying the list of one or more files comprises:
   displaying a list of one or more directories corresponding to the predetermined location;
   receiving a selection of a directory from the list of one or more directories; and
   displaying a list of files within the selected directory.

7. The method of claim 2, further comprising:
   executing, by the web browser, an HTML tag included in the script object if the script object is selected;
   driving, by the web browser, a file search module included in the image forming apparatus as a result of the executing the HTML tag; and
   searching, by the file search module, the one or more files from the predetermined location.

8. The method of claim 1, wherein
   the storing the scanned document file comprises storing the scanned document file in a predetermined location of the file system,
   the list of one or more files includes the scanned document file stored in the predetermined location,
   the predetermined location includes a document box corresponding to a user, and
   the document box has been generated by a box operation function of the image forming apparatus.

9. The method of claim 8, wherein the box operation function is a function to generate document boxes in the image forming apparatus corresponding to respective users or groups and to store one or more files generated by the scanner in the generated document boxes.

10. An image forming apparatus, comprising:
a scanner configured to generate a scanned document file by scanning a document;
a storage unit configured to store the scanned document file; and
a user interface unit configured to display a web page, including a script object to search for a file to be uploaded, received from a web server via a web browser of the image forming apparatus, wherein
the user interface unit is further configured to display a list of one or more files including the scanned document file stored in the storage unit in response to a user input selecting the script object to search for the file to be uploaded, and to receive a user input selecting the file to be uploaded from among the list of one or more files.

11. The apparatus of claim 10, wherein
the storage unit is configured to store the scanned document file in a predetermined location of the storage unit,
the user interface unit displays the list of one or more files including the scanned document file stored in the predetermined location, and
the predetermined location includes a predetermined directory of the storage unit.

12. The apparatus of claim 11, wherein the user interface unit is configured to select the file to be uploaded from within the predetermined location based on the user input selecting the file.

13. The apparatus of claim 10, wherein the web browser is configured to receive information regarding a specific location of the selected file in the storage unit.

14. The apparatus of claim 13, wherein the web browser is further configured to transmit the selected file to a predetermined destination using the information regarding the specific location of the selected file.

15. The apparatus of claim 11, wherein the user interface unit is configured to display a list of one or more directories corresponding to the predetermined location, to receive a selection of a directory from the list of one or more directories, and to display a list of files within the selected directory.

16. The apparatus of claim 10, wherein the web browser is configured to execute an HTML tag included in the script object if the script object is selected, to drive a file search module as a result of the executing the HTML tag.

17. The apparatus of claim 10, wherein
the storage unit is configured to store the scanned document file in a predetermined location of the storage unit,
the user interface unit displays the list of one or more files including the scanned document file stored in the predetermined location,
the predetermined location includes a document box corresponding to a user, and
the document box is generated by a box operation function of the image forming apparatus.

18. The method of claim 17, wherein the box operation function is a function to generate document boxes in the image forming apparatus corresponding to respective users or groups and to store files generated by the scanner in the generated document boxes.

19. An image forming apparatus, comprising:
a scanner configured to generate a scanned document file by scanning a document;
a storage unit configured to store the scanned document; and
a user interface unit configured to display a web page, including a script object to search for a file to be uploaded, received from a web server via a web browser of the image forming apparatus, wherein
the user interface unit is further configured to display a list of folders storing files in the storage unit in response to a user input selecting the script object to search for the file to be uploaded, and
the user interface unit is further configured to display a list of one or more files including the scanned document file stored in the selected folder in response to a user input selecting a folder which stores the file to be uploaded from among the list of folders.

20. The apparatus of claim 19, wherein
the storage unit is configured to store the scanned document file in a predetermined location of the storage unit, and
the user interface unit displays the list of folders stored in the predetermined location.

21. The apparatus of claim 20, wherein the user interface unit is configured to select the file to be uploaded from the selected folder within the predetermined location.

22. The apparatus of claim 19, wherein the web browser is configured to receive information regarding a specific location of the selected file in the storage unit.

23. The apparatus of claim 22, wherein the web browser is further configured to transmit the selected file to a predetermined destination using the information regarding the specific location of the selected file.

24. The apparatus of claim 19, wherein the web browser is configured to execute an HTML tag included in the script object if the script object is selected, to drive a file search module as a result of the executing the HTML tag.

25. The apparatus of claim 19, wherein
the scanner is configured to store the scanned document file in a predetermined location of the storage unit,
the user interface unit displays the list of one or more files including the scanned document file stored in the predetermined location,
the predetermined location includes a document box corresponding to a user, and
the document box is generated by a box operation function of the image forming apparatus.

26. The method of claim 25, wherein the box operation function is a function to generate document boxes in the image forming apparatus corresponding to respective users or groups and to store files generated by the scanner in the generated document boxes.

* * * * *

UNITED STATES PATENT AND TRADEMARK OFFICE
CERTIFICATE OF CORRECTION

PATENT NO.         : 9,549,088 B2
APPLICATION NO.    : 14/618409
DATED              : January 17, 2017
INVENTOR(S)        : Hyun-wook Park Page 1 of 1

It is certified that error appears in the above-identified patent and that said Letters Patent is hereby corrected as shown below:

In the Claims

Column 8, Line 5, Claim 1:
After "file" delete "to a web server", therefor.

Column 8, Line 11, Claim 1:
Delete "from the" and insert -- from a --, therefor.

Column 8, Line 31, Claim 3:
After "file" delete "is", therefor.

Column 8, Line 38, Claim 5:
Delete "to the" and insert -- to a --, therefor.

Column 10, Line 1, Claim 18:
Delete "method" and insert -- apparatus --, therefor.

Column 10, Line 54, Claim 26:
Delete "method" and insert -- apparatus --, therefor.

Signed and Sealed this
Eighteenth Day of April, 2017

Michelle K. Lee
*Director of the United States Patent and Trademark Office*